United States Patent
Oyabu et al.

(10) Patent No.: US 7,479,747 B2
(45) Date of Patent: Jan. 20, 2009

(54) STORAGE DEVICE AND MOTOR CONTROL DEVICE

(75) Inventors: Hiroshi Oyabu, Kawasaki (JP); Takao Abe, Kawasaki (JP); Tetsuya Tabuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 11/588,499

(22) Filed: Oct. 27, 2006

(65) Prior Publication Data

US 2007/0290641 A1  Dec. 20, 2007

(30) Foreign Application Priority Data

Jun. 15, 2006  (JP) ............................. 2006-166616

(51) Int. Cl.
*H02P 7/00* (2006.01)
(52) U.S. Cl. .............. 318/272; 318/400.11; 318/400.16
(58) Field of Classification Search ................. 318/272, 318/400.11, 400.16, 400.35, 430, 431, 700, 318/701, 720, 721
See application file for complete search history.

(56) References Cited

U.S. PATENT DOCUMENTS

| | | | |
|---|---|---|---|
| 5,623,379 | A | 4/1997 | Nishimura et al. |
| 6,229,274 | B1 * | 5/2001 | Vertemara et al. ............ 318/430 |
| 2004/0131342 | A1 * | 7/2004 | Masino ....................... 388/800 |

FOREIGN PATENT DOCUMENTS

| | | |
|---|---|---|
| JP | 6-195858 | 7/1994 |
| JP | 7-226016 | 8/1995 |

* cited by examiner

*Primary Examiner*—Karen Masih
(74) *Attorney, Agent, or Firm*—Greer, Burns & Crain, Ltd.

(57) ABSTRACT

In a storage device, a BEMF control is not performed on a motor and the motor is stopped if the motor is in a BEMF-control possible state. Once the motor has completely stopped, a start-up control is performed on the motor.

8 Claims, 7 Drawing Sheets

STORAGE DEVICE AND MOTOR CONTROL DEVICE

BACKGROUND OF THE INVENTION

1. Field of the Invention

The present invention relates to a technology for controlling driving of a motor of a storage medium, depending on a rotational state of the motor.

2. Description of the Related Art

In a magnetic disk device, a spindle motor is used to drive a magnetic disk. Two driving mode are used when driving the magnetic disk. One is a start-up mode in which the magnetic disk is driven from a non-rotating state and the other is a spin-up mode in which an already rotating magnetic disk is driven still faster.

Specifically, the start-up mode is a normal mode by which a spindle motor is driven. Through the start-up mode, a start-up control is performed for implementing control of phase switching (commutation) by which an electric current flows, from different directions, through coils forming the spindle motor, and when the spindle motor starts to rotate adequately, a spin-up control (or a BEMF(back electromotive force) control) is performed based on BEMF signals produced by the spindle motor.

The spin-up mode, on the other hand, includes driving the spindle motor after the magnetic disk is activated from a sleep state. In this case, the BEMF signals can be detected as the spindle motor is already in an inertial rotating state, and the BEMF control can be directly performed without going through the start-up control step.

Various technologies have been proposed to assuredly drive the spindle motor as well as to reduce a start-up time of the spindle motor. For example, Japanese Patent Application Laid-open No. H7-226016 discloses a technology for reducing the start-up time in the start-up mode, by stopping a steadily rotating motor, checking relative positions of a rotor and stator members, restarting the motor, and performing synchronous control. Specifically, the start-up time for the next Spin-On operation (at a time of starting up rotation) can be reduced by performing a brake operation and an aligning operation during Spin-Off operation (at a time of stopping rotation).

However, when the spindle motor is not rotating adequately for proceeding an operation to the spin-up mode. (to perform a BEMA control), a longer start-up time is required compared to a time required when the spindle motor is rotating adequately, because it is necessary to retry the start-up operation repeatedly and perform a start-up control after the spindle motor is stopped.

With the conventional technology described above, although the start-up time is reduced for the Spin-On operation (at a time of starting up the rotation) only in the start-up mode, operation time cannot be reduced in the spin-up mode.

SUMMARY OF THE INVENTION

It is an object of the present invention to at least partially solve the problems in the conventional technology.

According to an aspect of the present invention, a storage device that controls a motor of a storage medium to perform a start-up control to rotate the storage medium from a non-rotating state and perform a BEMF control to speed up rotation of the storage medium, the storage device includes a receiving unit configured to receive a command to drive the storage medium, a rotation determining unit that determines, when the receiving unit receives the command, whether the motor is in a BEMF-control possible state a BEMF control unit that performs the BEMF control on the motor when the rotation determining unit determines that the motor is in the BEMF-control possible state, a brake control unit that performs a brake control to stop the motor when the rotation determining unit determines that the motor is not in the BEMF-control possible state, and a start-up control unit that performs the start-up control on the motor when the motor has stopped due to the control of the brake control unit.

According to another aspect of the present invention, a motor control device that controls a motor of a storage medium to perform a start-up control to rotate the storage medium from a non-rotating state and perform a BEMF control to speed up rotation of the storage medium, the motor control device includes a receiving unit configured to receive a command to drive the storage medium, a rotation determining unit that determines, when the receiving unit receives the command, whether the motor is in a BEMF-control possible state, a BEMF control-unit that performs the BEMF control on the motor when the rotation determining unit determines that the motor is in the BEMF-control possible state, a BEMF control unit that performs a brake control to stop the motor when the rotation determining unit determines that the motor is not in the BEMF-control possible state, and a start-up control unit that performs the start-up control on the motor when the motor has stopped due to the control of the brake control unit.

According to still another aspect of the present invention, a motor control method of controlling a motor of a storage medium to perform a start-up control to rotate the storage medium from a non-rotating state and perform a BEMF control to speed up rotation of the storage medium, the motor control method includes receiving a command to drive the storage medium, determining, when the command is received at the receiving, whether the motor is in a BEMF-control possible state, performing the BEMF control on the motor when it is determined at the determining that the motor is in the BEMF-control possible state, performing a BEMF control to stop the motor when it is determined at the determining that the motor is not in the BEMF-control possible state, and performing the start-up control on the motor when the motor has stopped due to the performing of the brake control.

According to still another aspect of the present invention, a computer-readable recording medium that stores therein a computer program that causes a computer to control a motor of a storage medium to perform a start-up control to rotate the storage medium from a non-rotating state and perform a BEMF control to speed up rotation of the storage medium, the computer program causes the computer to execute, receiving a command to drive the storage medium, determining, when the command is received at the receiving, whether the motor is in a BEMF-control possible state, performing the BEMF control on the motor when it is determined at the determining that the motor is in the BEMF-control possible state, performing a brake control to stop the motor when it is determined at the determining that the motor is not in the BEMF-control possible state, and performing the start-up control on the motor when the motor has stopped due to the performing of the brake control.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail with reference to the accompanying drawings.

Figure 1A:
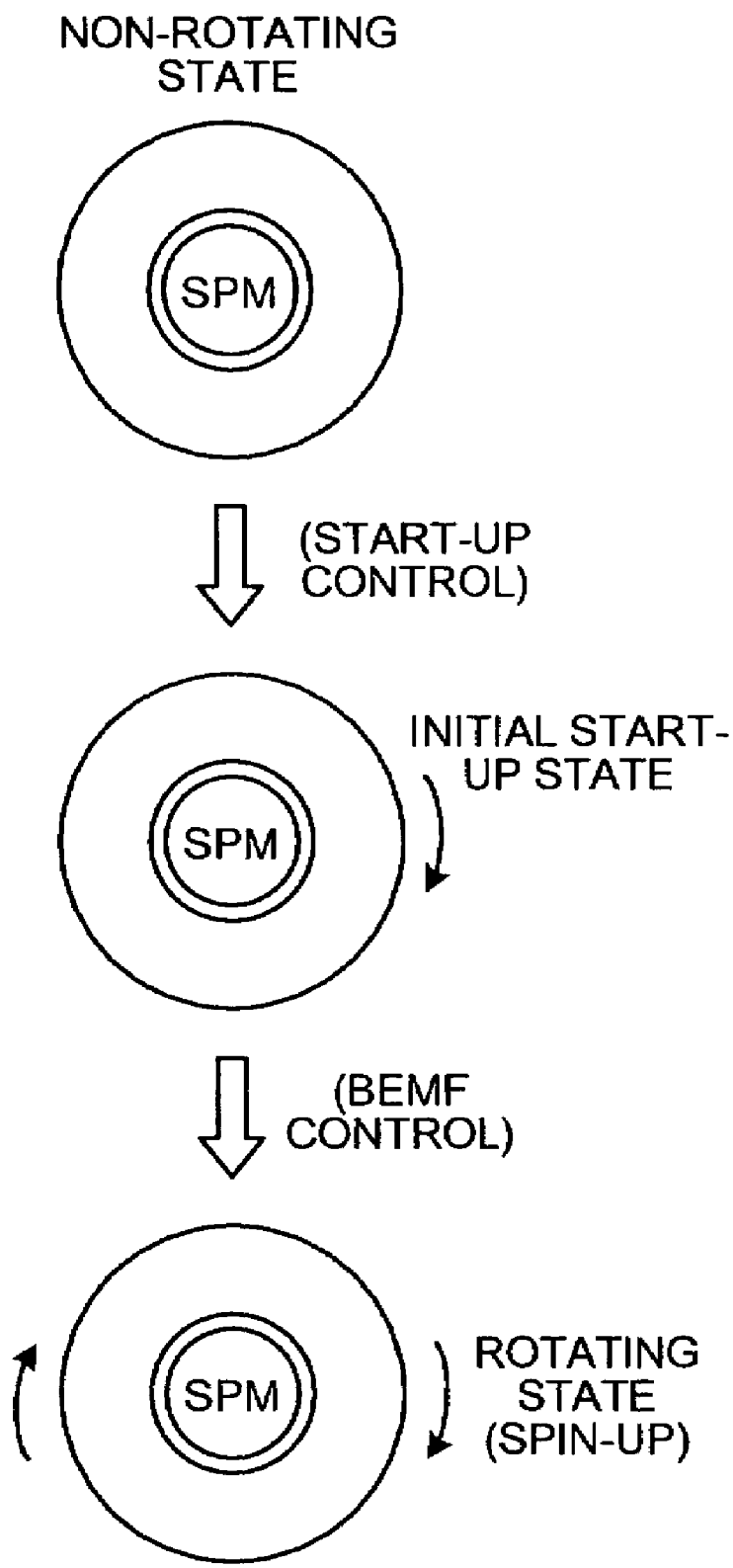
FIGS. 1A and 1B are schematics for explaining an overview and salient feature of a magnetic disk device according to a first embodiment of the present invention.
Figure 1B:
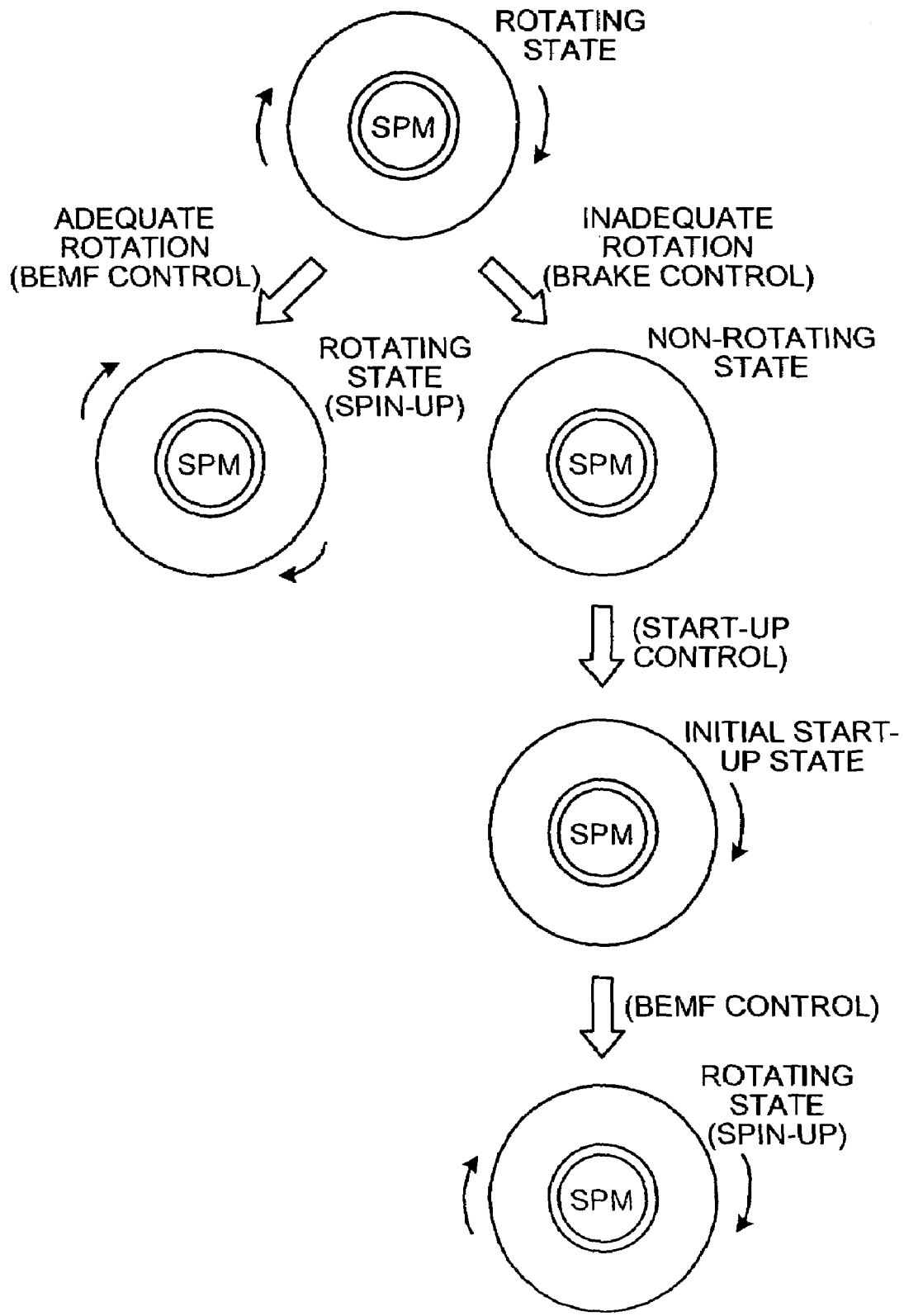

FIGS. 1A and 1B are schematics for explaining an overview and salient features of a magnetic disk device according to a first embodiment. As shown in FIGS. 1A and 1B, a storage medium (a magnetic disk, for instance) includes a spindle motor (SPM) at its center. Upon receiving a command to start-up the magnetic disk, the magnetic disk device drives (or causes to rotate) the SPM, and reads data from and writes data to the magnetic disk. There are two available modes of control for driving the SPM, namely, start up (rotation) from a non-rotating state (hereinafter, "start-up mode") and spin-up from the start-up state (hereinafter, "spin-up mode").

Specifically, the start-up mode is a normal mode by which the spindle motor is driven. Through the start-up mode, a start-up control is performed for implementing control of phase switching (commutation) by which an electric current flows, from different directions, through coils forming the spindle motor, and when the spindle motor starts to rotate adequately, a spin-up control (or a BEMF control) is performed based on BEMF zero cross detection signals produced by the spindle motor.

The spin-up mode, on the other hand, includes performing the operation of driving the spindle motor after the magnetic disk is activated from a sleep state. In this case, the BEMF zero cross detection signals (BEMF current, for example) can be detected as the spindle motor is already in an inertial rotating state, and the BEMF control can be directly performed without going through the start-up control step.

The magnetic disk device is configured to control the spindle motor of the magnetic disk inserted in the magnetic disk device, and is capable of assuredly and quickly driving the magnetic disk irrespective of the rotational state of the spindle motor. More specifically, as shown in FIG. 1A, for driving (rotating) a non-rotating magnetic disk (start-up mode), the magnetic disk device performs the start-up control to drive the spindle motor from the non-rotating state to the start-up state, and when the spindle motor reaches a rotational state in which the BEMF control can be performed (adequate rotation), the magnetic disk device performs the BEMF control to speed up the magnetic disk.

On the other hand, as shown in FIG. 1B, for speeding up a rotating magnetic disk (spin-up mode), the magnetic disk device determines whether the spindle motor is in a rotational state in which the BEMF control can be performed. For example, the magnetic disk device determines whether the spindle motor is in the rotational state in which the BEMF control can be performed (adequate rotation) by determining whether the magnitude of the BEMF voltage exceed a predetermined value.

Once it is determined that the spindle motor is rotating adequately, the magnetic disk device performs the BEMF control on the spindle motor. Specifically, as sufficient BEMF signals can be obtained when the spindle motor is rotating adequately, the magnetic disk device performs the BEMF control to speed up the spindle motor based on the BEMF signals.

If it is determined that the spindle motor is in a rotational state in which the BEMF control cannot be performed (inadequate rotation), the magnetic disk device performs a brake control to stop the spindle motor. Specifically, as sufficient BEMF signals are not obtained when the spindle motor is not rotating adequately and the BEMF control cannot be assuredly performed through the insufficient BEMF signals, the magnetic disk device performs the brake control to stop the spindle motor.

The magnetic disk device then performs the start-up control on the stopped spindle motor. Specifically, the magnetic disk device performs the start-up control to drive the stopped spindle motor, and when the spindle motor starts to rotate adequately, the magnetic disk device obtains sufficient BEMF signals and performs the spin-up control to speed up the spindle motor based on the obtained BEMF signals.

Thus, in the spin-up mode, when the spindle motor rotates adequately for enabling the BEMF control to be performed on the spindle motor (adequate rotation), the magnetic disk device drives the spindle motor by directly performing the BEMF control. On the contrary, in the spin-up mode, when the spindle motor is not rotating adequately for enabling the BEMF control to be performed on the spindle motor (inadequate rotation), the magnetic disk device stops the spindle motor, performs the start-up control, and performs the BEMF control after performing the start-up control. In the start-up mode, the magnetic disk device performs the start-up control on the spindle motor in a non-rotating state, and thereafter, when the spindle motor starts rotating adequately, performs the spin-up control. Thus, the magnetic disk device assuredly and quickly drives the spindle motor irrespective of the rotational state of the spindle motor.

Figure 2:
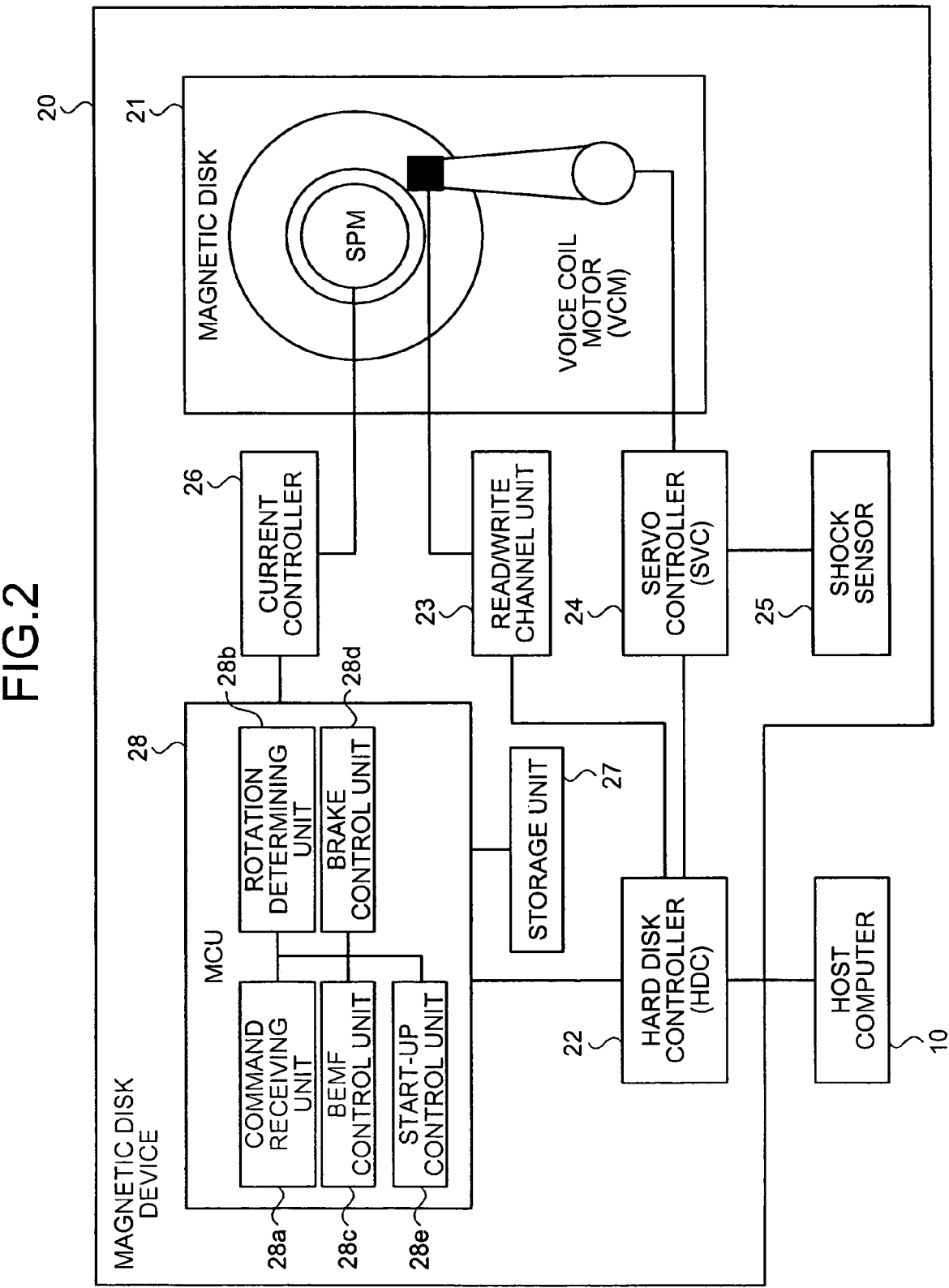
FIG. 2 is a block diagram of the magnetic disk device according to the first embodiment.

FIG. 2 is a block diagram of a magnetic disk device 20. The magnetic disk device 20 includes a magnetic disk 21, a hard disk controller (HDC) 22, a read/write channel unit 23, a servo controller (SVC) 24, a shock sensor 25, a current controller 26, a storage unit 27, and a micro control unit (MCU) 28.

The magnetic disk 21 is a storage medium for writing data thereto and reading data therefrom and is inserted into the magnetic disk device 20. The magnetic disk 21 is spun by the spindle motor (SPM) and data is written to and read from the magnetic disk 21 through a head moved to a relevant position by a voice coil motor (VCM). The HDC 22 includes an interface, receives various instructions from a host computer 10 connected via the interface, and transmits the instructions to the various functional units. For example, upon receiving an instruction to control the spindle motor, the HDC 22 transmits the received instruction to the MCU 28, and upon receiving a read/write instruction, the HDC 22 transmits the read/ write instruction to the SVC 24 for writing data or sending data to the host computer 10, via the read/write channel unit 23.

The read/write channel unit 23 controls reading data from and writing data to the magnetic disk 21, and includes a modulation circuit for writing data to and a demodulation circuit for reading data from the magnetic disk 21. The SVC 24 controls an operation of the VCM. Specifically, upon receiving a write request or a read request from the HDC 22, the SVC 24 controls the VCM to move the head to a relevant writing position or reading position. The shock sensor 25 senses shocks (shaking or jolt), to which the magnetic disk 21 is subjected during data writing or data reading through the head.

The current controller 26 controls current flow to the spindle motor (SPM). Specifically, based on a request from the MCU 28, the current controller 26 feeds the current required for driving or stopping the spindle motor, and transmits the BEMF signals produced by the spindle motor to the MCU 28. The storage unit 27 stores various types of data and programs required for various processes performed by the MCU 28. For example, the storage unit 27 stores a threshold value for determining whether the spindle motor is rotating adequately.

The MCU 28 includes an internal memory for storing programs for various process procedures and required data and performs the processes using the programs and the data. In particular relevance to the present invention, the MCU 28 includes a command receiving unit 28a, a rotation determining unit 28b, a BEMF control unit 28c, a brake control unit 28d, and a start-up control unit 28e, all of which collectively representing control units 28a to 28e. The control units 28a to 28e are stored in a not shown read-only memory (ROM) and retrieved to be executed by the MCU 28. In the present embodiment, the control units 28a to 28e that are configured as program modules of a firmware of the MCU 28 are realized by a firmware program of a central processing unit (CPU), however, the control units 28a to 28e can be configured in other ways.

The command receiving unit 28a receives various commands from the HDC 22 and transmits the commands to other functional units. For example, upon receiving a Spin-On (start-up rotation) command from the HDC 22, if the spindle motor is in a rotating state, the command receiving unit 28a transmits the command to the rotation determining unit 28b, and if the spindle motor is in a non-rotating state, the command receiving unit 28a transmits the command to the start-up control unit 28e. Upon receiving a Spin-Off (stop rotation) command from the HDC 22, the command receiving unit 28a transmits the command to the brake control unit 28d.

Upon receiving the command to drive the magnetic disk 21, the rotation determining unit 28b determines whether the spindle motor is rotating adequately for enabling the BEMF control to be performed. For example, upon receiving the Spin-On command from the command receiving unit 28a, the rotation determining unit 28b refers to the threshold value stored in the storage unit 27 and determines whether the spindle motor is rotating adequately for enabling the BEMF control to be performed, based on a determination whether the magnitude of the BEMF signals detected by the current controller 26 exceeds the threshold value. If it is determined that the spindle motor is rotating adequately, the rotation determining unit 28b transmits a request instruction to the BEMF control unit 28c instructing that the rotation is adequate, and if it is determined that the spindle motor is not rotating adequately, the rotation determining unit 28b transmits a request instruction to the brake control unit 28d instructing that the rotation is inadequate.

The BEMF control unit 28c performs the BEMF control on the spindle motor if the rotation determining unit 28b determines that the rotation is adequate. Specifically, upon receiving the request instruction instructing that the rotation is adequate from the rotation determining unit 28b, the BEMF control unit 28c transmits the request instruction to the current controller 26 to perform the BEMF control on the spindle motor based on the BEMF signals produced by the spindle motor.

The brake control unit 28d performs the brake control to stop the spindle motor if the rotation determining unit 28b determines that the rotation is inadequate. Specifically, upon receiving the request instruction instructing that the rotation is inadequate from the rotation determining unit 28b, the brake control unit 28d transmits the request instruction to the current controller 26 to perform the brake control on the spindle motor, because the BEMF control cannot be performed based on the BEMF signals produced by the spindle motor.

The start-up control unit 28e performs the start-up control on the spindle motor when the spindle motor is stopped by the brake control unit 28d. Specifically, upon detecting that the spindle motor is stopped by the brake control unit 28d, the start-up control unit 28e transmits a request instruction to the current controller 26 to perform the start-up control for driving the spindle motor. Similarly, when the spindle motor is initially in non-rotating state, the start-up control unit 28e transmits the request instruction to the current controller 26 to perform the start-up control to drive the spindle motor from the initial non-rotating state.

Specifically, since there is no sensor in a motor of the magnetic disk device 20, the magnetic disk device 20 controls the motor based on the BEMF current produced by the motor. For example, if the motor used is a twelve-pole motor having twelve points crossing with the center tap (CT), one rotation of the motor produces BEMF zero crossing 36 times from all the U, V, and W phases. The magnetic disk device 20 controls the motor so that the signals are produced at regular intervals in a desired timeframe. In other words, when the motor is in a non-rotating state and no BEMF is produced, because the motor cannot be controlled, the magnetic disk device 20 needs to switch the phases by forward pulses (FW) to drive the motor to rotate adequately for enabling the BEMF control to be performed. When driving the motor from an inertial rotation, if the rotation is adequate for enabling the BEMF control to be performed on the motor, the magnetic disk device 20 directly proceeds to perform the BEMF control. However, if the rotation is not adequate for enabling the BEMF control to be performed on the motor, the magnetic disk device 20 stops the motor by performing the brake control, switches the phases by the FW pulses, and drives the motor to rotate adequately for enabling the BEMF control to be performed.

Figure 3:
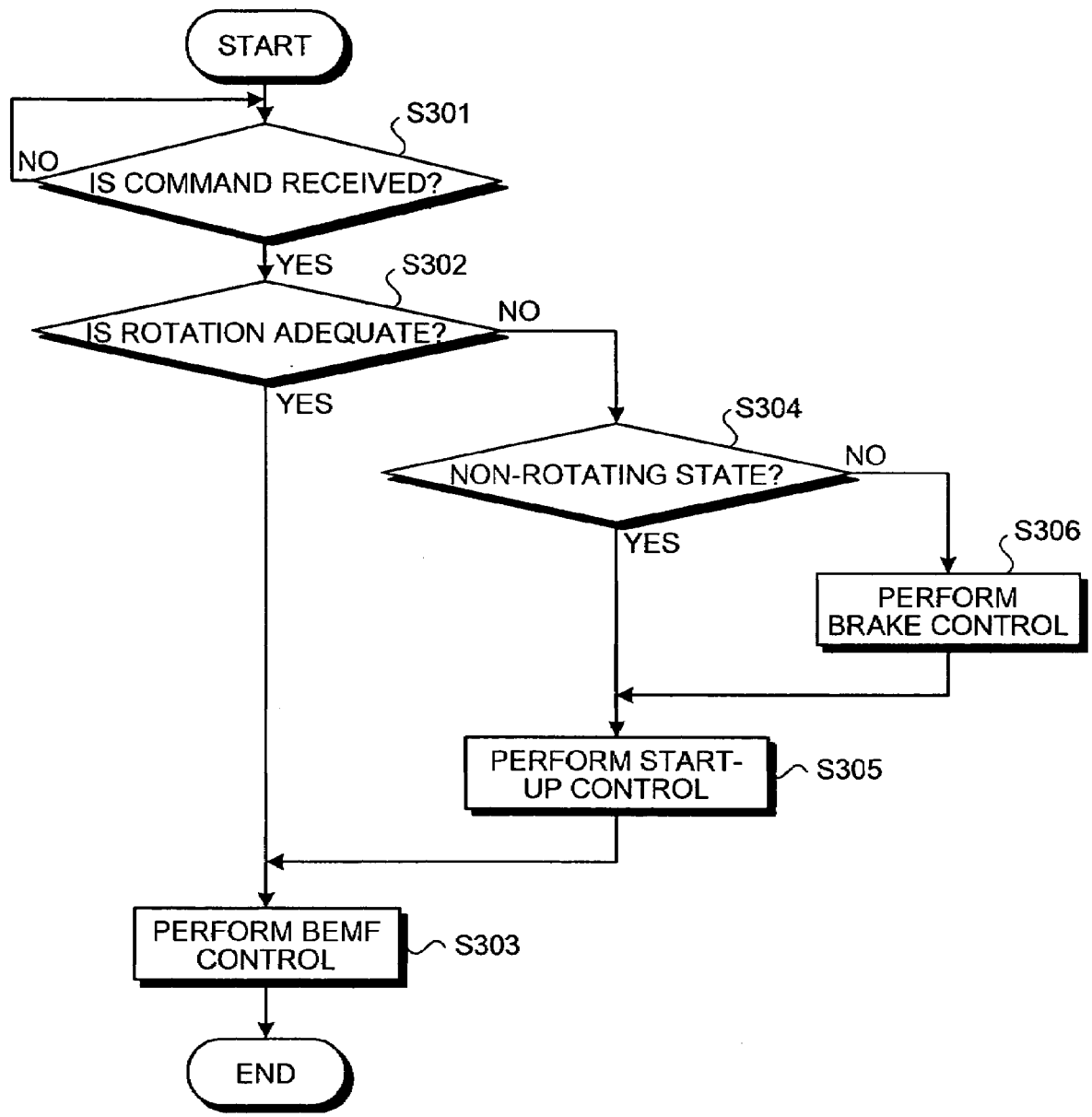
FIG. 3 is a flowchart of a spindle-motor control process of the magnetic disk device according to the first embodiment.

FIG. 3 is a flowchart of a spindle-motor control process of the magnetic disk device 20. Upon receiving the Spin-On (start-up rotation) command to write data to or read data from the magnetic disk 21 (step S301), the rotation determining unit 28b of the magnetic disk device 20 determines whether the spindle motor is rotating adequately for enabling the BEMF control to be performed (step S302).

If the rotation determining unit 28b determines that the spindle motor is rotating adequately (Yes at step S302), the BEMF control unit 28c performs the BEMF control on the spindle motor (step S303). If the rotation determining unit 28b determines that the spindle motor is not rotating adequately (No at step S302), the magnetic disk device 20 checks whether the spindle motor is in a non-rotating state (step S304). If the spindle motor is in the non-rotating state (Yes at step S304), the start-up control unit 28e performs the start-up control on the spindle motor (step S305), and when the spindle motor starts to rotate adequately for enabling the BEMF control to be performed, the BEMF control unit 28c performs the BEMF control on the spindle motor (step S303). If the spindle motor is not in a non-rotating state (No at step S304), the brake control unit 28d performs the brake control to stop the spindle motor (step S306). When the spindle motor is stopped, the start-up control unit 28e performs the start-up control on the spindle motor (step S305), and when the spindle motor starts to rotate adequately, the BEMF control unit 28c performs the BEMF control on the spindle motor (step S303).

According to the first embodiment, upon receiving the command to drive the magnetic disk, the magnetic disk device determines whether the spindle motor is rotating adequately for enabling the BEMF control to be performed. When the spindle motor is rotating adequately, the magnetic disk device performs the BEMF control on the spindle motor, and when the spindle motor is not rotating adequately, the magnetic disk device performs the brake control to stop the spindle motor and performs the start-up control. Accordingly, for driving the spindle motor in the spin-up mode (BEMF control), the magnetic disk device directly performs the BEMF control when the spindle motor is rotating adequately for enabling the BEMF control to be performed on the spindle motor. When the spindle motor is not rotating adequately, the magnetic disk device stops the spindle motor, performs the start-up control, and performs the BEMF control after the start-up control. For driving the spindle motor in the start-up mode, the magnetic disk device performs the start-up control in the initial non-rotating state. Therefore, the magnetic disk device can assuredly and quickly drive the magnetic disk irrespective of the rotational state of the spindle motor, data reading and data writing can be performed without retrying rotation control due to inadequate rotation, and the utility value of the magnetic disk device can be improved.

According to the first embodiment, the magnetic disk device determines whether the spindle motor is rotating adequately for enabling the BEMF control to be performed based on a determination whether the magnitude of the BEMF produced by the spindle motor exceed; a predetermined value. As a result, the magnetic disk device can determine more easily whether the spindle motor is rotating adequately for enabling the BEMF control to be performed, by determining whether the magnitude of the BEMF exceed a predetermined value.

According to the first embodiment, the magnetic disk device determines whether the BEMF control is to be performed, based on a determination whether the magnitude of the BEMF exceed a predetermined value. On the other hand, according to a second embodiment of the present invention, the magnetic disk device determines whether the BEMF control is to be performed, based on a determination whether rotation count of the spindle motor exceeds a predetermined value.

Figure 4:
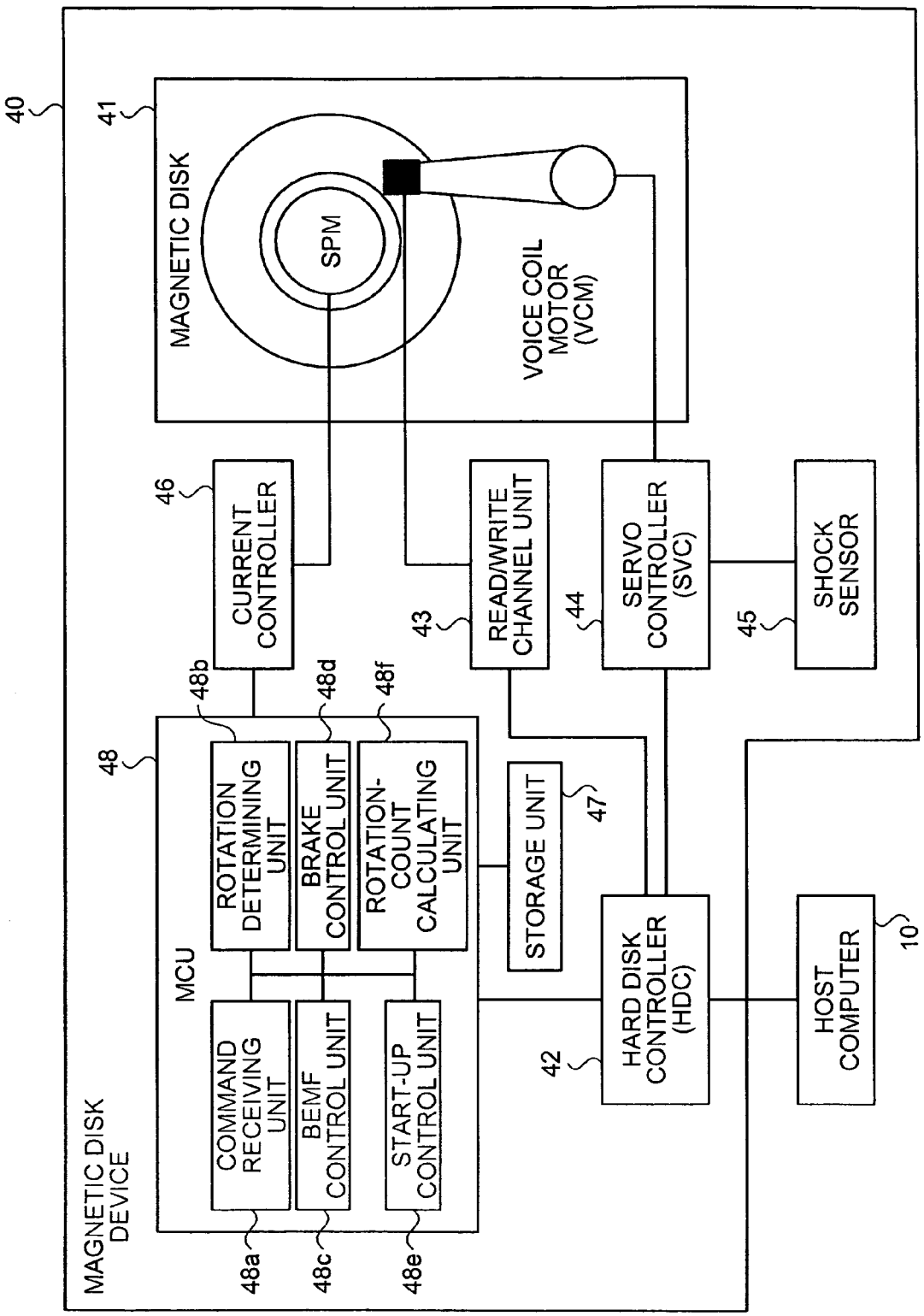
FIG. 4 is a block diagram of a magnetic disk device according to a second embodiment of the present invention.

FIG. 4 is a block diagram of a magnetic disk device 40 according to the second embodiment. The magnetic disk device 40 includes a magnetic disk 41, an HDC 42, a read/write channel unit 43, an SVC 44, a shock sensor 45, a current controller 46, a storage unit 47, and an MCU 48. All the functional units of the magnetic disk device 40 are functionally similar to the corresponding functional units of the magnetic disk device 20 shown in FIG. 2, except for the storage unit 47, a rotation determining unit 48b, and a rotation-count calculating unit 48f of the MCU 48. Only the functional units unique to the second embodiment are described below.

The storage unit 47 stores data and programs required for various processes of the MCU 48. For example, the storage unit 47 stores a threshold value, with which the rotation determining unit 48b of the MCU 48 determines whether the spindle motor is rotating adequately for enabling the BEMF control to be performed, based on a determination whether the rotation count calculated by the rotation-count calculating unit 48f exceeds a predetermined rotation count. As an example, the threshold value can be 300 rpm, to be stored in the storage unit 47 for determining whether the spindle motor is rotating adequately.

The rotation determining unit 48b of the MCU 48 determines whether the spindle motor is rotating adequately for enabling the BEMF control to be performed, based on a determination whether the rotation count calculated by the rotation-count calculating unit 48f exceeds a predetermined value. For example, the rotation determining unit 48b refers to the threshold value (300 rpm, for example) stored in the storage unit 47, and determines whether the spindle motor is rotating adequately for enabling the BEMF control to be performed, based on a determination whether the rotation count calculated by the rotation-count calculating unit 48f exceeds the threshold value.

The rotation-count calculating unit 48f calculates the rotation count of the spindle motor based on the BEMF zero cross detection signals produced by the spindle motor. For example, upon receiving the Spin-On command from a command receiving unit 48a, the rotation-count calculating unit 48f receives the BEMF signals produced by the spindle motor from the current controller 46, calculates the rotation count of the spindle motor based on the BEMF signals, and transmits the calculated rotation count to the rotation determining unit 48b.

Figure 5:
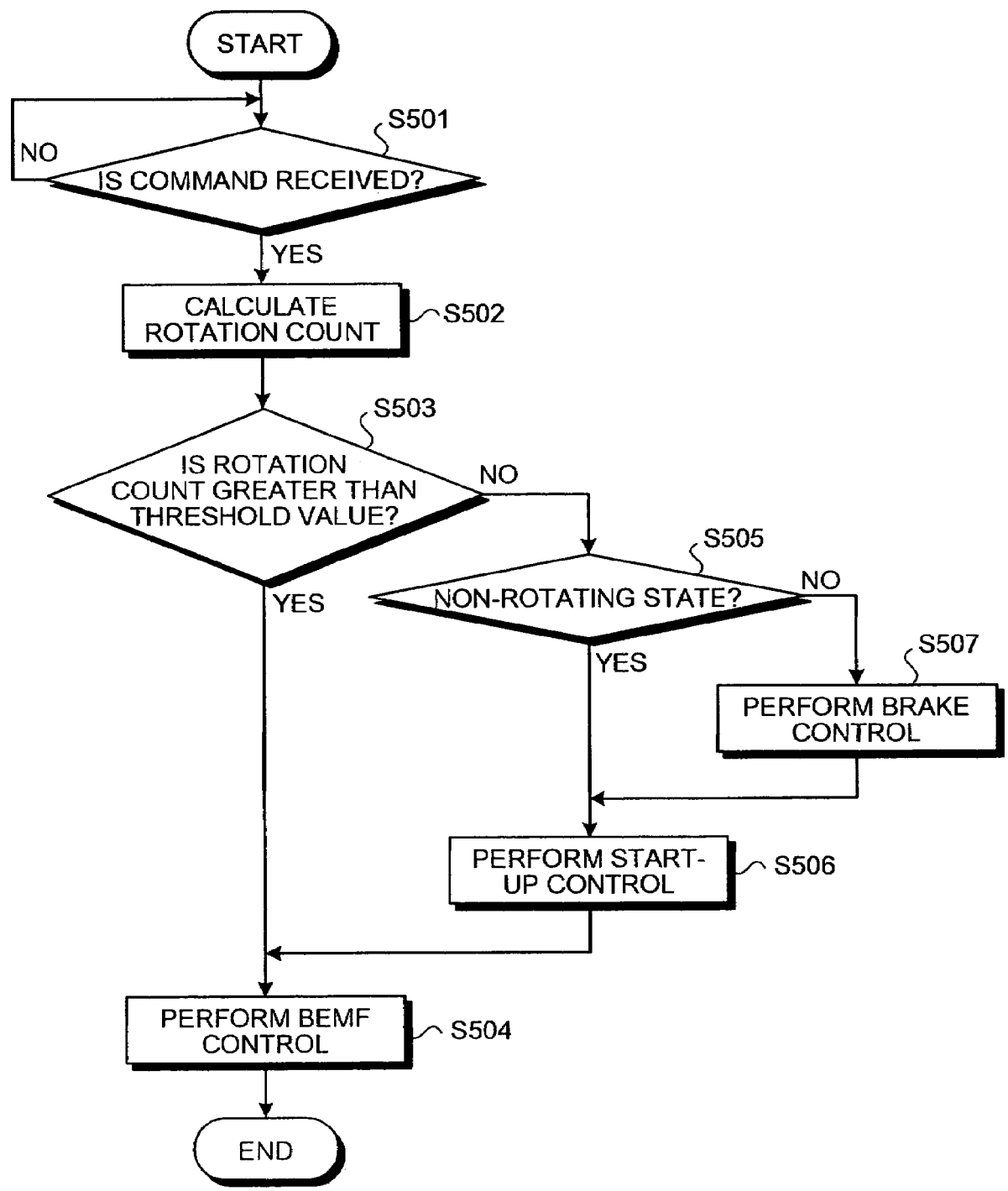
FIG. 5 is a flowchart of a spindle-motor control process of the magnetic disk device according to the second embodiment.

FIG. 5 is a flowchart of a spindle-motor control process of the magnetic disk device 40. Upon receiving the Spin-On (start-up rotation) command to write data to or read data from the magnetic disk 41 (step S501), the rotation-count calculating unit 48f of the magnetic disk device 40 calculates the rotation count of the spindle motor based on the BEMF signals produced by the spindle motor (step S502).

The rotation determining unit 48b determines whether the spindle motor is rotating adequately for enabling the BEMF control to be performed, based on a determination whether the rotation count calculated by the rotation-count calculating unit 48f exceeds a predetermined rotation count (step S503). Specifically, the rotation determining unit 48b refers to the threshold value (300 rpm, for example) stored in the storage unit 47, and determines whether the spindle motor is rotating adequately for enabling the BEMF control to be performed, based on a determination whether the rotation count calculated by the rotation-count calculating unit 48f exceeds the threshold value (300 rpm). If the rotation determining unit 48b determines that spindle motor is rotating adequately (Yes at step S503), a BEMF control unit 48c performs a BEMF control on the spindle motor (step S504). If the rotation determining unit 48b determines that the spindle motor is not rotating adequately (No at step S503), the magnetic disk device 40 performs operations at steps S505 to S507 as shown in FIG. 5. Since steps S505 to S507 are identical to steps S304 to S306 shown in FIG. 3, the explanations thereof will be omitted.

According to the second embodiment, the magnetic disk device calculates the rotation count of the spindle motor based on the BEMF signals produced by the spindle motor, and determines whether the spindle motor is rotating adequately for enabling the BEMF control to be performed, based on a determination whether the calculated rotation count exceeds a predetermined value. Because the magnetic disk device determines whether the spindle motor is rotating adequately by calculating the rotation count from the BEMF signals, it becomes possible to more precisely determine whether the spindle motor is rotating adequately for enabling the BEMF control to be performed. Further, it becomes possible to easily change the threshold value of the rotation count, depending on a unique threshold value of unique rotation count for each magnetic disk, resulting in realizing precise settings.

The embodiments described above allow various modifications. The modifications to the described embodiments are collectively described as a third embodiment of the present invention.

According to the first and the second embodiments, the magnetic disk device includes only a single brake rotation-count range at which the brake control is performed. However, the magnetic disk device can include a plurality of the brake rotation-count ranges and can be configured to perform the brake control according to the calculated rotation count of the spindle motor.

Figure 6:
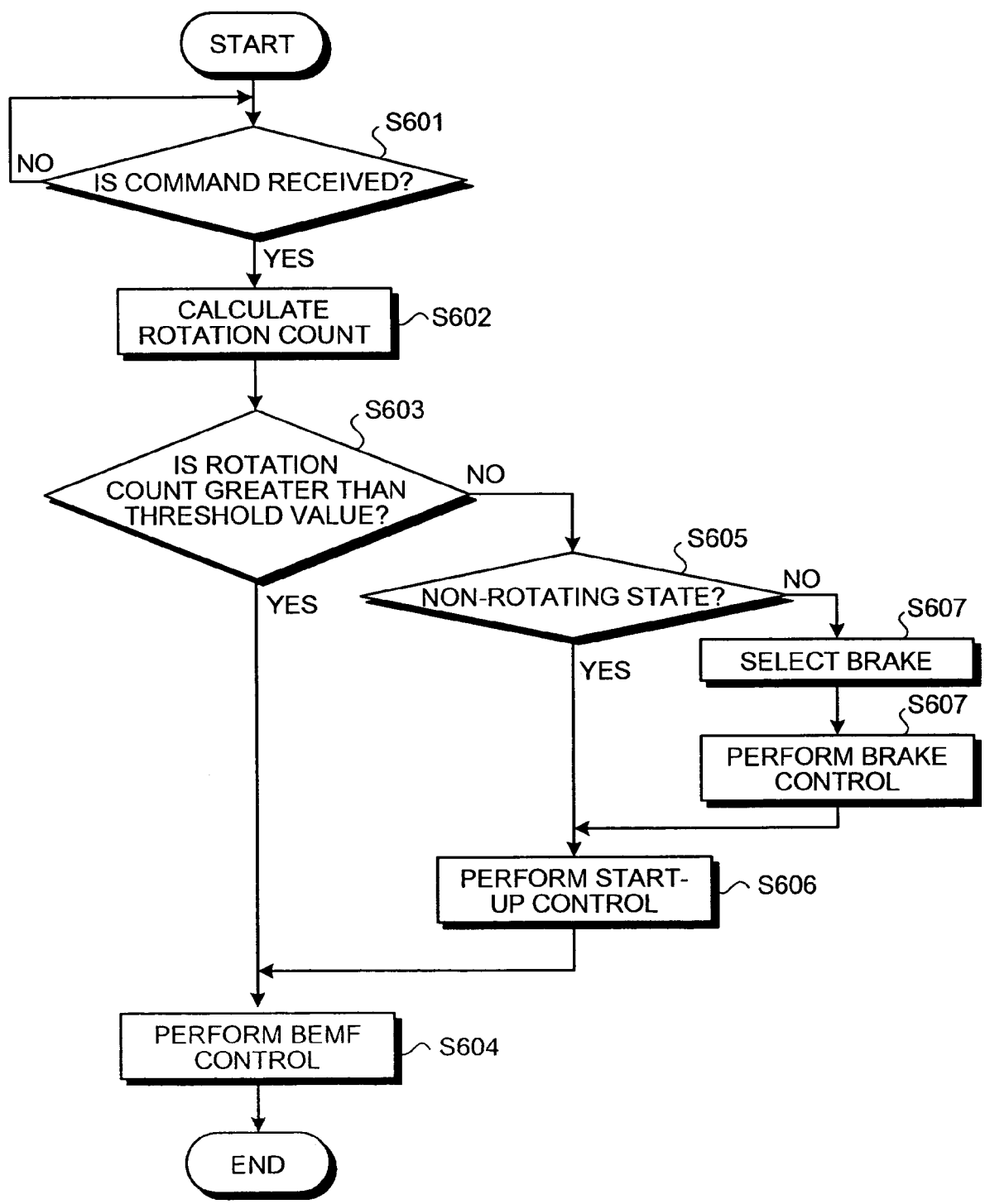
FIG. 6 is a flowchart of a spindle-motor control process of a magnetic disk device according to a third embodiment of the present invention.

FIG. 6 is a flowchart of a spindle-motor control process of the magnetic disk device according to the third embodiment. Steps S601 to S605 (calculating the rotation count, and determining, based on the rotation count, whether the spindle motor is rotating adequately for enabling the BEMF control to be performed) are identical to steps S501 to S505 shown in FIG. 5 explained with the second embodiment, and therefore the explanations thereof will be omitted.

If the calculated rotation count is less than the threshold value (No at step S603) and it is determined that the spindle motor is rotating (No at step S605), the magnetic disk device selects a brake corresponding to the calculated rotation count (step S607), and performs the brake control by the selected brake (step S608). If it is determined that the spindle motor is not rotating (Yes at step S605), the magnetic disk device performs the start-up control on the spindle motor (step S606). When the spindle motor starts to rotate adequately for enabling the BEMF control to be performed, the magnetic disk device performs the BEMF control on the spindle motor (step S604).

The magnetic disk device includes a plurality of the brake rotation-count ranges corresponding to the calculated rotation count, and performs the brake control based on the calculated rotation count. For example, when the calculated rotation count is far below the rotation count in the rotational state for enabling the BEMF control to be performed (adequate rotation), the magnetic disk device performs the brake control in a span of 400 milliseconds. (ms). When the calculated rotation count is close to the rotation count in the rotational state for enabling a BEMF control to be performed, the magnetic disk device performs the brake control in a span of 600 ms. In other words, the magnetic disk device performs the brake control with a consideration of the fact that the closer the calculated rotation count to the rotational state for enabling the BEMF control to be performed, the longer it takes to stop the spindle motor, and vice versa. Thus, the magnetic disk device can perform the brake control for a short duration, and at the same time, can allow adequate stopping time for the spindle motor. As a result, the spindle motor can be driven more quickly.

The constituent elements of the magnetic disk device are merely conceptual and do not necessarily physically resemble the structures shown in the drawings. For instance, the magnetic disk device as a whole or in parts can be broken down or integrated either functionally or physically in accordance with the load or how the device is to be used (for example, the current controller and the SVC can be integrated). The process functions performed by the device are entirely or partially realized by control devices such as a micro computer unit (MCU) (or a CPU) or a micro processing unit (MPU) or by a program executed by the MCU (or the CPU), the MPU, or a hardware using wired logic.

All the automatic processes explained in the embodiments presented herein can be, entirely or in part, carried out manually. Similarly, all the manual processes explained in the present embodiment can be entirely or in part carried out automatically by a known method. The process procedures, the control procedures, specific names, and data, including various parameters mentioned in the description and drawings can be changed as required unless otherwise specified. Although a magnetic disk is presented as the storage medium in the embodiments presented herein, the present invention can be similarly applied to other storage devices using a motor for rotating the storage medium.

A computer (for example, the MCU of the magnetic disk device 20) can realize spindle-motor control process of the magnetic disk device described in the first, the second, and the third embodiments (see, FIG. 3, FIG. 5, and FIG. 6) by executing a ready program. The program can be downloaded via a network such as the Internet. The program can be recorded stored in a computer-readable recording medium such as a compact disk-read only memory (CD-ROM), magneto optic (MO) disk, digital versatile disk (DVD), and can be read therefrom and executed by the computer.

According to the present invention, in the spin-up mode, when the spindle motor rotates adequately for enabling the BEMF control to be performed on the spindle motor (adequate rotation), the magnetic disk device drives the spindle motor by directly performing the BEMF control. In the spin-up mode, when the spindle motor is not rotating adequately for enabling the BEMF control to be performed on the spindle motor (inadequate rotation), the magnetic disk device stops the spindle motor, performs the start-up control and performs the BEMF control after the start-up control. In the start-up mode, the magnetic disk device performs the start-up control on the spindle motor in the non-rotating state, and thereafter, when the spindle motor starts rotating adequately, performs the spin-up control. Thus, the magnetic disk device assuredly and quickly drives the spindle motor, irrespective of the rotational state of the spindle motor.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage device that controls a motor of a storage medium to perform a start-up control to rotate the storage medium from a non-rotating state and perform a BEMF control to speed up rotation of the storage medium, the storage device comprising:
   a receiving unit configured to receive a command to drive the storage medium;
   a rotation determining unit that determines, when the receiving unit receives the command, whether the motor is in a BEMF-control possible state;
   a BEMF control unit that performs the BEMF control on the motor when the rotation determining unit determines that the motor is in the BEMF-control possible state;

a brake control unit that performs a brake control to stop the motor by sending a brake signal to the motor when the rotation determining unit determines that the motor is not in the BEMF-control possible state; and a start-up control unit that performs the start-up control on the motor by sending a start-up signal to the motor after the motor has stopped due to the control of the brake control unit.

2. The storage device according to claim 1, wherein the rotation determining unit determines whether the motor is in the BEMF-control possible state based on a magnitude of a BEMIF signal produced by the motor.

3. The storage device according to claim 1, further comprising a rotation-count calculating unit that calculates a rotation count of the motor based on a BEMF signal produced by the motor, wherein the rotation determining unit determines whether the motor is in the BEMF-control possible state based on the rotation count.

4. The storage device according to claim 3, wherein the brake control unit performs the break control based on a brake rotation-count range in which the calculated rotation count falls.

5. A motor control method of controlling a motor of a storage medium to perform a start-up control to rotate the storage medium from a non-rotating state and perform a BEMF control to speed up rotation of the storage medium, the motor control method comprising:

receiving a command to drive the storage medium;

determining, when the command is received at the receiving, whether the motor is in a BEMF-control possible state;

performing the BEMF control on the motor when it is determined at the determining that the motor is in the BEMF-control possible state;

performing a brake control to stop the motor by sending a brake signal to the motor when it is determined at the determining that the motor is not in the BEMF-control possible state; and performing the start-up control on the motor by sending a start-up signal to the motor after the motor has stopped due to the performing of the brake control.

6. The motor control method according to claim 5, wherein the determining includes determining whether the motor is in the BEMF-control possible state based on a magnitude of a BEMF signal produced by the motor.

7. The motor control method according to claim 5, further comprising calculating a rotation count of the motor based on a BEMF signal produced by the motor, wherein the determining includes determining whether the motor is in the BEMF-control possible state based on the rotation count.

8. The motor control method according to claim 7, wherein the performing of the brake control includes performing the break control based on a brake rotation-count range in which the calculated rotation count fall.

* * * * *

UNITED STATES PATENT AND TRADEMARK OFFICE
CERTIFICATE OF CORRECTION

PATENT NO.        : 7,479,747 B2
APPLICATION NO. : 11/588499
DATED             : January 20, 2009
INVENTOR(S)       : Hiroshi Oyabu It is certified that error appears in the above-identified patent and that said Letters Patent is hereby corrected as shown below:

Col. 11, line 12, delete "BEMIF" and insert --BEMF--.

Signed and Sealed this

Fifth Day of May, 2009

JOHN DOLL
*Acting Director of the United States Patent and Trademark Office*